United States Patent [19]
Ooms

[11] Patent Number: 5,538,030
[45] Date of Patent: Jul. 23, 1996

[54] COUPLING FOR CONNECTING CONDUITS IN AN AUTOMATIC DEVICE FOR DISTRIBUTING A FOOD PRODUCT

[76] Inventor: Guido Ooms, Beringenbaan 110, 3295 Diest, Belgium

[21] Appl. No.: 325,225

[22] PCT Filed: Apr. 13, 1993

[86] PCT No.: PCT/BE93/00017

§ 371 Date: Oct. 21, 1994

§ 102(e) Date: Oct. 21, 1994

[87] PCT Pub. No.: WO93/21102

PCT Pub. Date: Oct. 28, 1993

[30] Foreign Application Priority Data

Apr. 22, 1992 [BE] Belgium ............................... 09200362

[51] Int. Cl.⁶ .................................................. F16K 37/00
[52] U.S. Cl. .................... 137/240; 137/558; 251/149.6
[58] Field of Search ...................... 137/558, 580, 137/240; 251/149.6

[56] References Cited

U.S. PATENT DOCUMENTS

| | | | |
|---|---|---|---|
| 1,602,647 | 10/1926 | Carr | 137/580 |
| 1,942,241 | 1/1934 | Duhme | 137/558 |
| 3,677,220 | 7/1972 | Ostwald et al. | 137/558 |
| 4,144,901 | 3/1979 | Stevenson | 137/240 |
| 4,186,759 | 2/1980 | Stevenson et al. | 137/240 |
| 4,848,381 | 7/1989 | Livingston et al. | 137/240 |
| 5,311,899 | 5/1994 | Isayama et al. | 251/149.6 |

*Primary Examiner*—A. Michael Chambers
*Attorney, Agent, or Firm*—Bacon & Thomas

[57] ABSTRACT

A coupling for removably connecting a conduit for a cleaning liquid to a conduit in an automatic device for distributing a liquid or semi-liquid food product includes a first male connection piece having a body provided with a passage to which the conduit of the automatic device connects and a female connection piece removably connectable about the body of the male connection piece. The female connection piece is open at one end and connected at its open end in a leak-proof way to the body of the male connection piece but surrounds in a spaced manner with its closed end an extremity of the body of the male connection piece. The female connection piece is provided, in a wall thereof located laterally with respect to the passage, with an opening for connecting the cleaning conduit.

6 Claims, 3 Drawing Sheets

COUPLING FOR CONNECTING CONDUITS IN AN AUTOMATIC DEVICE FOR DISTRIBUTING A FOOD PRODUCT

BACKGROUND OF THE INVENTION

The invention relates to a coupling for removably connecting a conduit for cleaning liquid to a conduit in an automatic device for distributing a liquid or semi-liquid food product, which coupling comprises a first male connection piece with a body provided with a passage to which the conduit connects and a female connection piece formed by a recipient which is opened at one end, removably connecting with its open end in a leak-proof way to the body of the male connection piece but surrounding with its closed end, with an interval, an extremity of the body of the male connection piece on which the passage in this connection piece gives, while the recipient is provided in its wall and laterally with respect to the passage through the body, with an opening for connecting the cleaning conduit, which opening gives on said interval.

Such couplings can be used with automatic devices for distributing soft-ice and the like. During normal operation the male connection piece is connected to a reservoir containing a liquid composition to connect the automatic device conduit to the reservoir. The composition is pumped from the reservoir, eventually whipped with air and cooled in a cooling element.

A coupling of this kind is disclosed in CH-A-400.047. The body of the male connection piece is formed by the dispensing tube of a whipped cream dispenser, the lower end of which tube is always open. Additional food products possibly contained in the tube can drop down when the dispensing tube, removed from the dispenser body, is brought to the female connection piece. While the dispensing tube in a whipped cream dispenser cannot contain large quantities of food product and can easily be emptied before the dispensing tube is removed from the dispenser body. In soft-ice distributing devices and the like large quantities of food product are present in the conduit connected to the male connecting piece. Dropping of the food product will dirty the inside of the distributing device. This can be partly avoided by holding a container under the male connection piece when transporting it from the reservoir containing the liquid composition towards the female connection piece, but that complicates the cleaning.

A coupling comprising anon-return valve in one of the connection pieces is known as such from EP-A-270.302. However this coupling is not for connecting to a conduit for cleaning liquid and non of the connection pieces is a recipient surrounding the other connection piece. The cleaning of the outside of the connection piece which services to be introduced in a reservoir with a liquid food composition is not possible.

SUMMARY OF THE INVENTION

The invention aims at providing, in such a coupling for connecting conduits in an automatic device for distributing a food product, for a simple and efficient way of cleaning the automatic device conduit as well as the male connection piece.

To this end, a recoil valve is mounted in the passage of the body of the male connection piece, which valve, when the male connection piece is free or connects the automatic device conduit to a reservoir, only allows a flow towards the automatic device conduit, and the recipient forming the female connection piece is provided at its bottom and opposite the passage with a pin which automatically pushes the recoil valve in the passage towards an open position when the recipient is connected to the male connection piece.

The passage is open when liquid is pumped from the reservoir, and the passage is automatically closed if the male connection piece is disconnected from the reservoir, so that no liquid can flow out of the conduit which is connected to it. The recoil valve has no effect whatsoever on the cleaning as during cleaning the connection pieces are connected together and the recoil valve is pushed in open position.

In a particular embodiment of the invention, at least one electrode is mounted inside the body of the male connection piece, said electrode being electrically isolated from the body and having one extremity located in the passage of the body, the other extremity being provided with a connection for an electric conductor for the connection to a measuring instrument.

When the male connection piece is connected to the reservoir with liquid composition, an idling message is obtained. With known automatic devices for distributing soft-ice, this idling message takes place by means of a vacuum system. Such a system, however, can only be used for rigid reservoirs. Nowadays, mainly supple bags are used. These bags would be sucked empty by the vacuum and block the outlet. According to the invention, no vacuum is used. Even if the supple reservoir is empty, it cannot get in contact with the measuring extremity of the electrode, which is protected by the body of the connection piece.

In another particular embodiment of the invention, the male connection piece is provided with a junction piece for the automatic device conduit, which is mounted rotatably on the body, and the inside of which connects in a leakproof way to the passage through this body.

The passage through the body is preferably located axially, while the body is preferably round.

In a preferred embodiment the coupling comprises means for removably connecting the recipient of the female connection piece and the body of the male connection piece together.

These means are effectively formed by two brace parts which are connected hingeably to the recipient and clutch around a part of the male connection piece when they are rotated towards each other.

BRIEF DESCRIPTION OF THE DRAWINGS

In order to better show the characteristics of the invention, a preferred embodiment of a coupling for connecting conduits in an automatic device for distributing a food product according to the invention, is described hereafter as an example without any limitative character whatsoever, reference being made to the accompanying drawings, in which.

DETAILED DESCRIPTION OF THE PREFERRED EMBODIMENT

Figure 1:
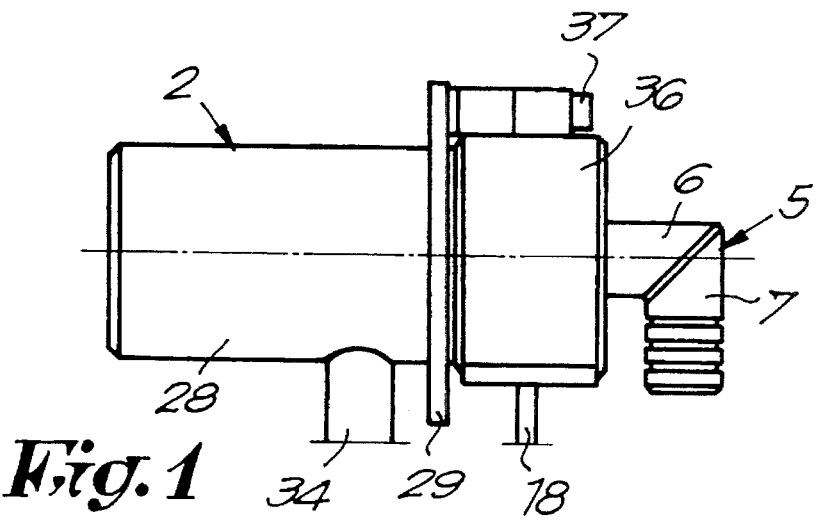
FIG. 1 represents a side view of the coupling according to the invention during cleaning.
Figure 3:
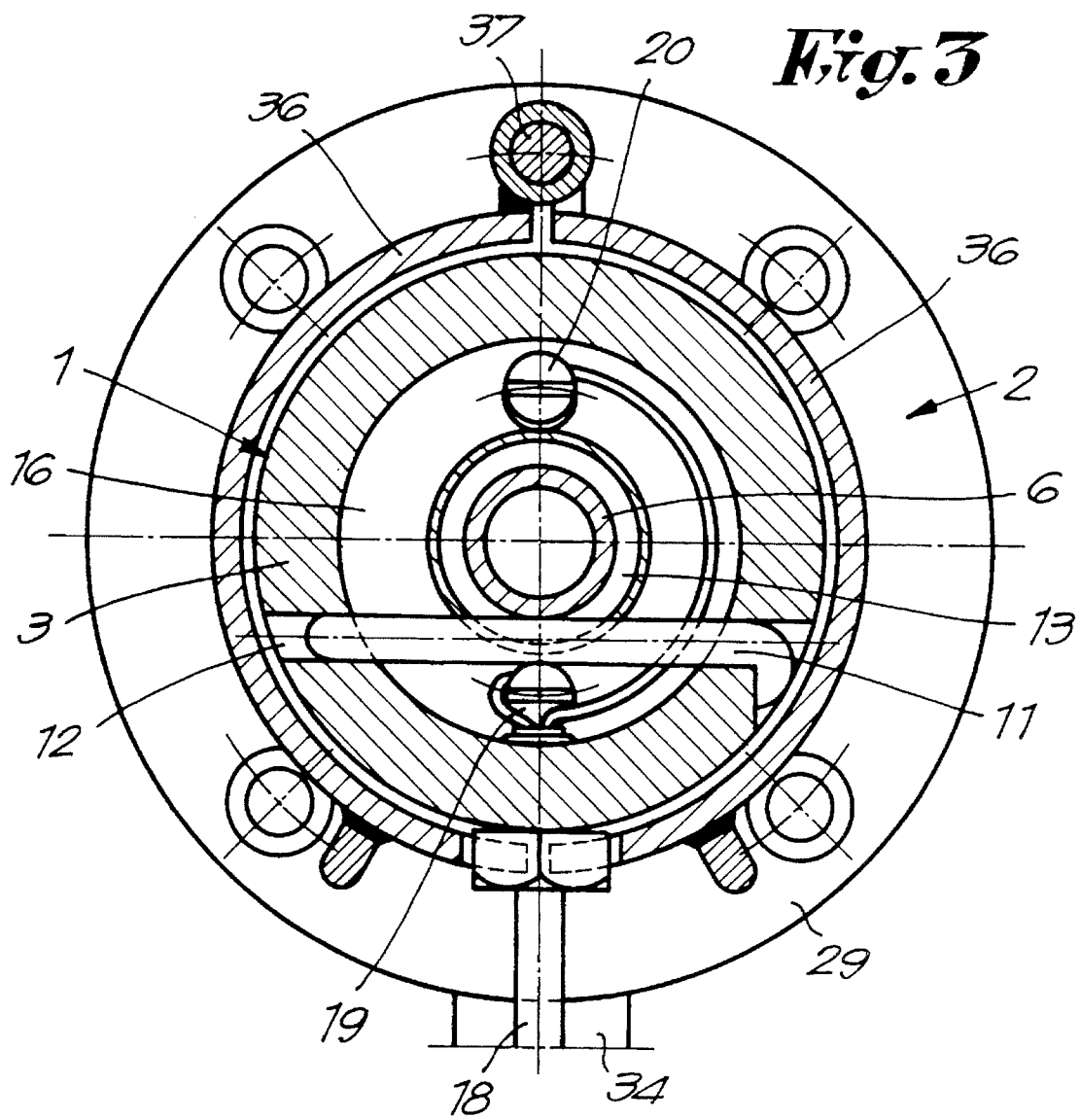
FIG. 3 represents a section according to line III—III in FIG. 2.
Figure 2:
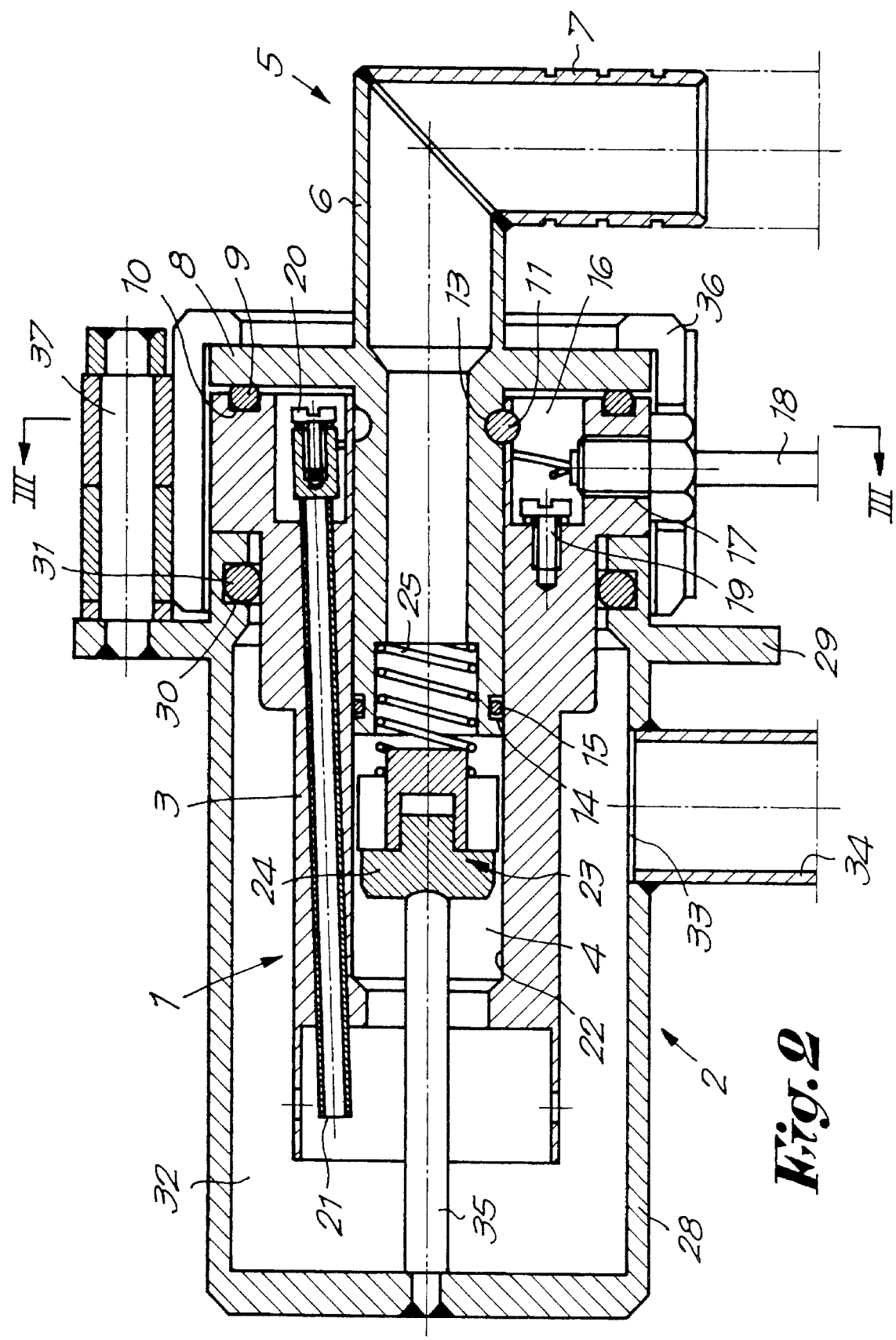
FIG. 2 represents a longitudinal section of the coupling from FIG. 1, on an enlarged scale.

The coupling represented in FIGS. 1 to 3 comprises of a male connection piece 1 and a female connection piece formed by a cylindrical recipient 2, mounted thereon. The coupling is destined for connecting an automatic device conduit for liquid used for human consumption in an automatic device for distributing soft-ice and a cleaning conduit. The connection pieces are therefore made of stainless steel.

The male piece 1 comprises a round body 3 which is provided with an axial passage 4 and a junction piece 5 which is rotatably mounted on the body 3.

The junction piece 5 is formed by a tube with two tube parts 6 and 7 which are perpendicular to each other. The tube part 6 protrudes with one extremity loosely in the passage 4 and is provided at the outside of the body 3 with a flange 8 connecting to a sealing ring 9 which is mounted in a groove 10 concentrically surrounding the passage 4 in an extremity of the body 3. This tube part 6 is held in the passage 4 by means of a pin 11 protruding through a hole 12 in the body 3, directed transversally to the passage and located partly in this passage 4, and is partly located in a groove 13 which extends over the circumference of the tube part 6 at the hole 12. This pin 1 retains the junction piece 5 on the body 3 without interfering with its rotation.

At its extremity, the tube part 6 is provided around its circumference with a groove 14 in which a sealing ring 15 is located which is pressed against the wall of the passage 4.

A supple part of an automatic device conduit, not represented in the figures, connecting to the blending pump of the ice-machine, is tightly slipped over the conduit part 7.

At the extremity against which the flange 8 is located, the body is provided with a concentric groove 16, which leads outside of the body 3 through a hole 17. Through this hole 17 and groove 16 protrude two electric conductors 18 which are attached diametrically with respect to each other respectively with a screw 19 to the bottom of the groove 16 and with a screw 20 to an electrode 21. This electrode 21, the upper side of which is located in the groove 16, is electrically isolated from the body 3 and protrudes transversely through this body into the extremity of the passage 4 away from the junction piece 5. This electrode 21 is part of an idling detection. When the extremity of the electrode which is located in the passage 4 is in contact with liquid, a different tension exists between the contacts formed by the screws 19 and 20 than when no liquid is in contact with the electrode.

The diameter of the body 3 decreases gradually towards an extremity, while the passage 4 shows a narrowing near the narrowest extremity of the body 3, forming a seat 22 of a recoil valve 23. This recoil valve comprises a valve body 24, which is pushed in the direction of the seat 22 by a spring 25, leaning on the extremity of the conduit part 6 located in the passage 4.

Figure 4:
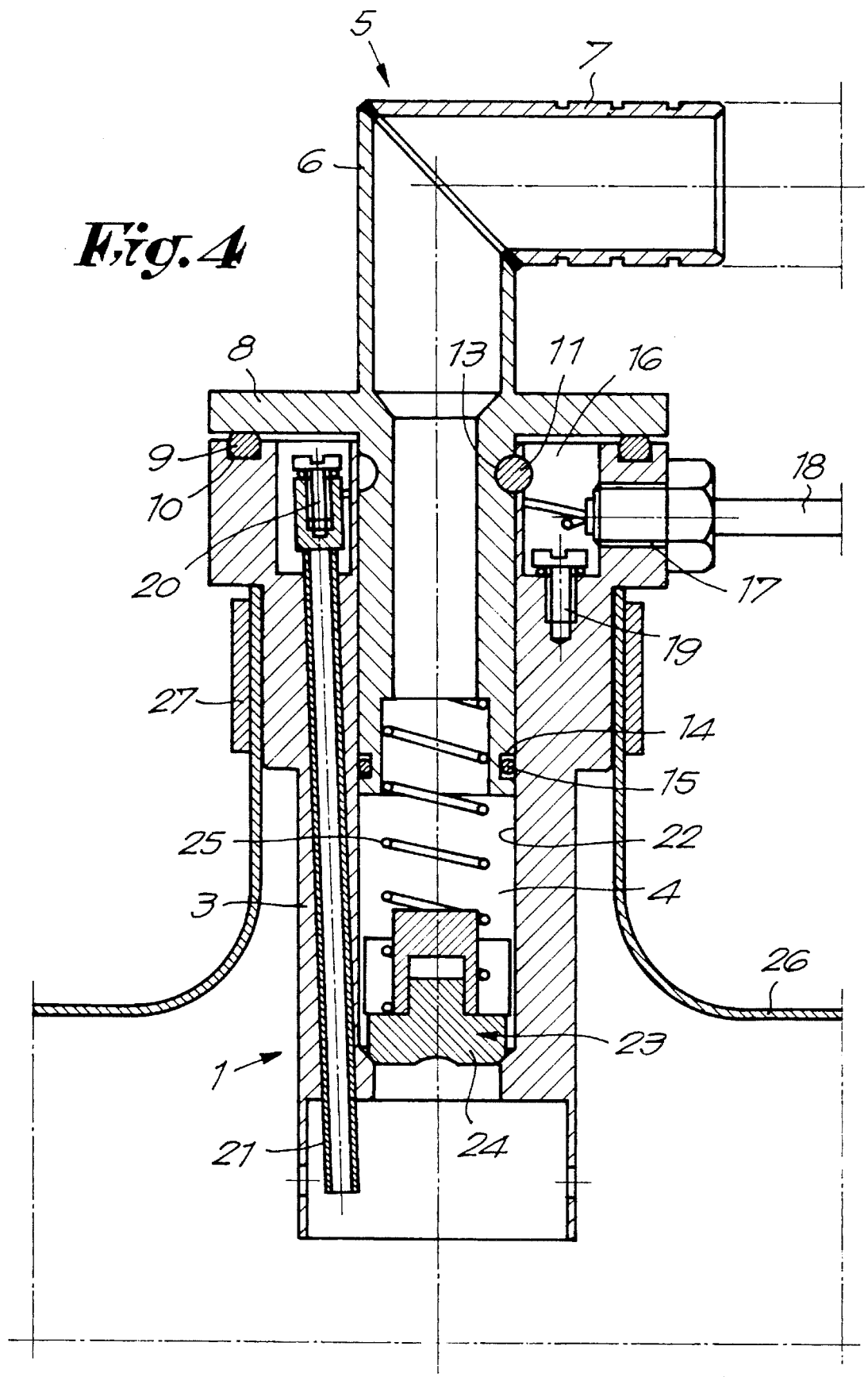
FIG. 4 represents a section similar to that of FIG. 2, but of the male connection piece mounted on a reservoir.

The above-described male connection piece 1 is, during normal operation of the soft-ice machine, connected to a bag 26 with a liquid composition, for instance for producing ice, as represented in FIG. 4. The body 3 mainly protrudes in the bag 26 and its thicker extremity against which the flange 8 is located, is clutched against the end of the neck of the bag 26 by means of an elastic clamping ring 27.

As long as liquid composition is present in the bag 26, the measuring extremity of the electrode 21 is moisturized during the pumping up of the composition and, as mentioned before, a tension difference originates between the contacts 19 and 20, which is supplied to a measuring instrument as a signal through a lead 18. When the bag 26 is empty, the electrode 21 stays dry and thus an other signal is supplied to the measuring instrument, so that this can signal that the bag 26 is empty.

When cleaning the automatic device conduit, the male connection piece 1 is disconnected from the bag 26 and connected to the female connection piece formed by the recipient 2.

This recipient 2 consists of a cylindrical open cask 28 on which near its open extremity an outwardly directed shoulder 29 is mounted. The recipient is fixed in the automatic device with this shoulder 29 so that the cask is directed horizontally with its symmetry axis. Near its open extremity, the cask 28 is provided with a groove 30 over its inner circumference, in which a rubber sealing ring 31 is located. By means of this ring 31, the cask 28 connects in a leak-proof way to a middle part of the body 3, with its outmost extremity against the end part with larger diameter of the body 3, as is clearly represented in FIG. 2.

Especially between an end part, having a smaller diameter than the middle part, and the wall of the cask 28, and between the extremity of the body 3 and the bottom of the cask 28, a space 32 is left over. In the wall of the cask 28 a hole 33 opening into this space 32 is applied opposite the side wall of the body 3, namely near the shoulder 29. A cleaning conduit 34 is welded with its extremity in this hole and thus leads to the space 32.

On the bottom of the cask 28 a pin 35 is located, which, when the recipient is slipped over the body 3, protrudes in the passage 4 and pushes the valve body 24 of the recoil valve 23 into an open position, that is away from the seat 22.

Although the recipient is somewhat clutched on the body 3 with the sealing ring 31, it is held on this body 3 by means of two brace parts 36 which are hingeable around a mutual hinge pin 37 which is located on the shoulder 29. When rotated towards each other, these brace parts 36 clutch with a folded edge around the flange 8. Due to the horizontal disposition of the cask 28, the coupling is placed in such a way during cleaning that the passage 4 in the body 3 is directed almost horizontally and that the hinge pin 37 is located on top. The brace parts 36 then fall towards each other due to their own weight and remain around the connection piece 1.

To clean, the recipient is slipped over the body 3 of the connection piece 1 in the position represented in FIGS. 1 and 2, but with the brace parts 36 rotated open, which are immediately thereafter released and allowed to rotated towards each other so that they couple the connection piece 1 and the recipient to each other. When cleaning liquid is supplied through the cleaning conduit 34, this liquid cannot flow straight in the passage 4, but needs to cover a detour with direction changes over the interval 32, so that turbulence is produced there.

The outside surface of the body 3 which is located in space 32 is, also due to this turbulence, cleaned thoroughly. Of course the passage 4 with the inside of the junction piece 5 and the automatic device conduit connected thereto are also thoroughly cleaned.

Not only can the coupling and uncoupling of the cleaning conduit and the automatic device conduit to be cleaned be executed fast and simply, but especially the cleaning of the latter conduit and the male connection piece 1 is very effective.

The present invention is in no way limited to the embodiment described above and represented in the figures, but such a coupling for connecting conduits in an automatic device for distributing a food product and connection pieces thereof can be realized in different forms and dimensions without leaving the scope of the invention as claimed.

I claim:

1. A coupling assembly comprising:

a male connection piece including a body provided within a longitudinally extending internal passage that opens at one end of the body, a first longitudinal end portion of said passage being formed with a seat;

a conduit opening into a second longitudinal end portion of said passage;

a recoil valve mounted for longitudinal movement within said internal passage between open and closed positions, said recoil valve abutting said seat in said closed position;

means for biasing said recoil valve to said closed position such that said recoil valve normally only permits flow in one direction within said passage, wherein when the first longitudinal end portion of said passage is placed in fluid communication with a liquid medium, said recoil valve can be longitudinal displaced against forces acting thereon by said biasing means in order to provide a flow of the liquid medium through said passage and into said conduit, and a female connection piece adapted to be sealing attached with said male connection piece for cleaning said male connection piece, said female connection piece being defined by an enclosure having a first, closed end and a second, open end adapted to receive said male connection piece with said female connection piece extending about at least the first longitudinal end portion of said male connection piece with a space therebetween, said female connection piece including a hole leading from a cleaning conduit to said space and a pin member extending from the first closed end thereof, wherein said pin member automatically engages and shifts said recoil valve to said open position within said passage when said female connection piece is attached to said male connection piece.

2. The coupling assembly according to claim 1, further comprising at least one electrode mounted within the body of said male connection piece, said electrode being electrically isolated from the body and having one end portion thereof located in said passage, another end portion of said electrode being provided with a connection for attaching an electrical conductor of a measuring instrument thereto.

3. The coupling assembly according to claim 1, further comprising a junction piece rotatably mounted to said male connection piece and including a portion in sealing fluid communication with said passage.

4. The coupling assembly according to claim 1, wherein said body is generally cylindrical and said passage extends axially within said body.

5. The coupling assembly according to claim 1, further comprising means for connecting said female connection piece to the body of said male connection piece.

6. The coupling assembly according to claim 5, wherein said connecting means comprises a pair of brace parts hingedly attached to said female connection piece and means for causing said brace parts to clutch about said male connection piece when said brace parts are rotated towards each other.

* * * * *